Patented Feb. 27, 1945

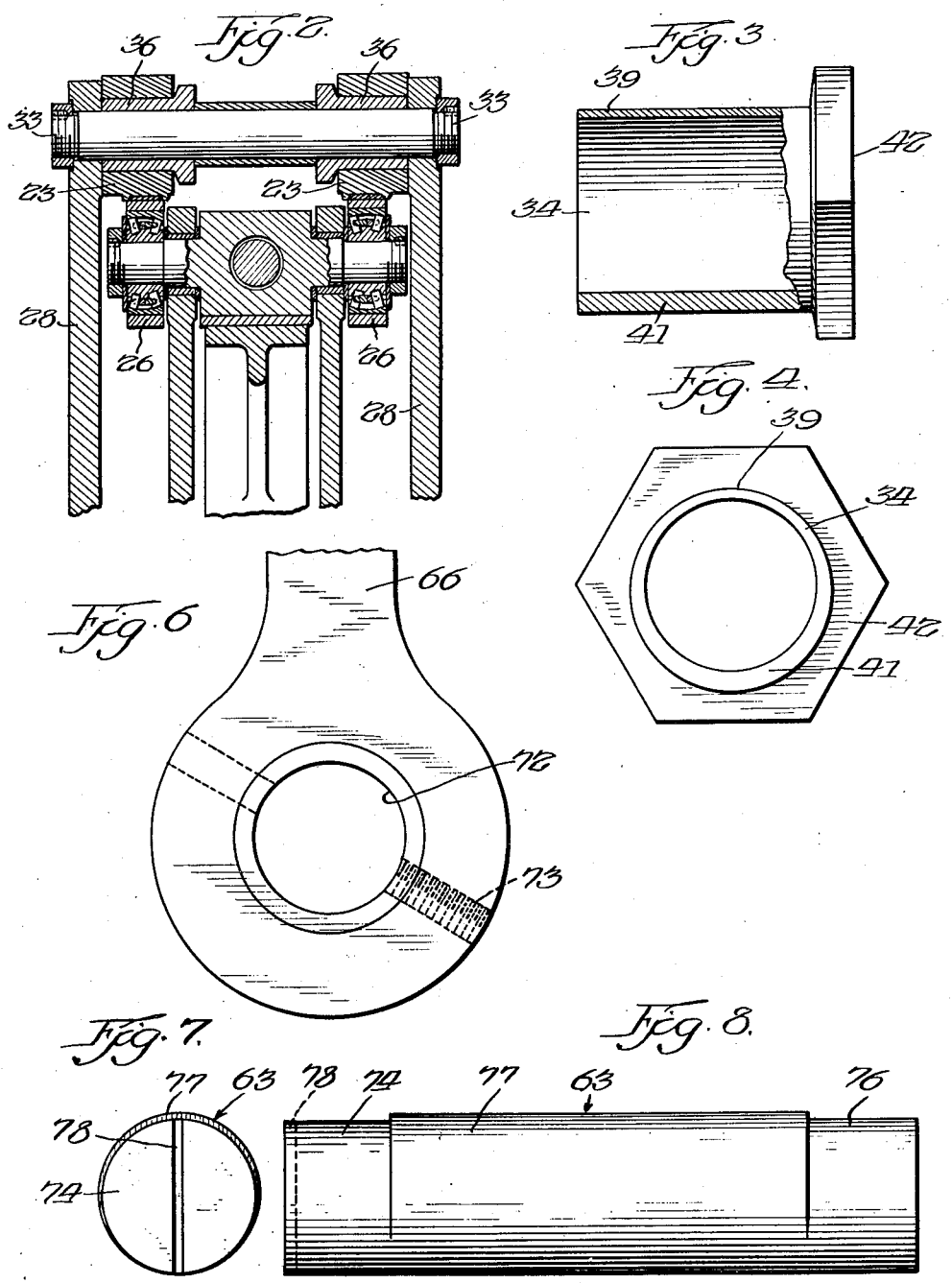

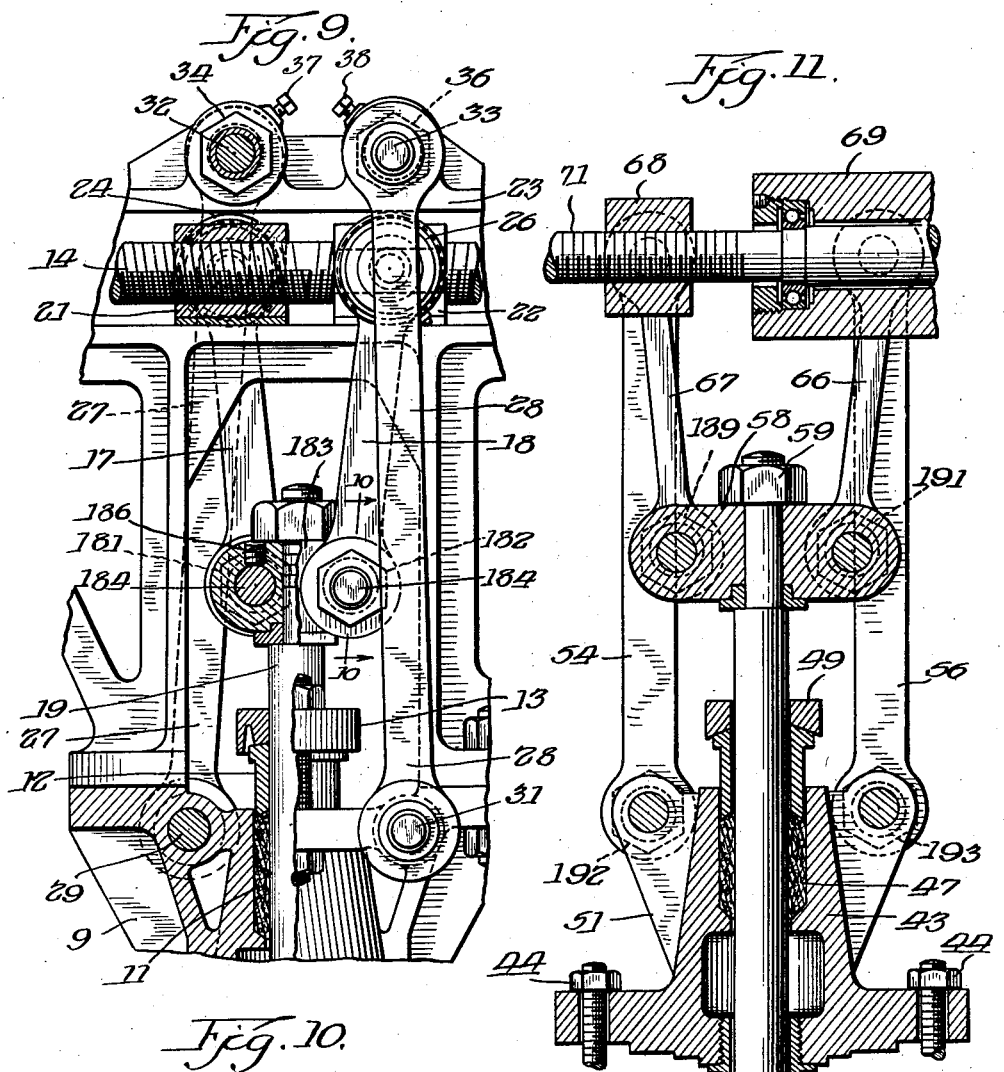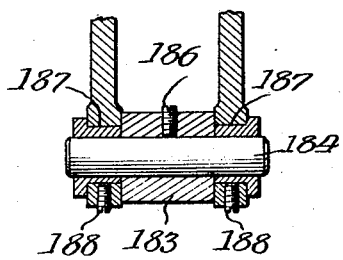

2,370,604

UNITED STATES PATENT OFFICE 2,370,604

VALVE ACTUATING MEANS

Edmond P. De Craene, Westchester, and Richard Fennema, Chicago, Ill., assignors to Crane Co., Chicago, Ill., a corporation of Illinois Application March 2, 1944, Serial No. 524,798

4 Claims. (Cl. 74—520)

This invention relates to toggle mechanisms adapted for use on valves and is a continuation-in-part of our copending application filed September 21, 1942, under Serial No. 459,204, as shown in Figs. 1 to 8, inclusive, in the drawings. The remaining Figs. 9, 10 and 11 in the drawings show new and further improvements in toggle mechanisms, not disclosed in our copending application, wherein adjustment means are provided on both the tie rods and toggle arms.

Although toggle mechanisms have been widely employed for operating closure members for valves, they have heretofore been difficult to mount in proper alignment with valve closure stems and actuating means therefor due to inaccuracies in machining. As a result of misalignment of the toggle arms and tie rods with respect to the valve stem and each other, the several parts would either bind or require an excessive amount of power for operation, or would bend the valve stem or subject same and the bearings therefor to severe wear and short service life.

It is, therefore, an object of this invention to provide means for properly aligning the tie rods and toggle arms with respect to each other and with a valve stem to overcome inaccuracies in machining and to insure proper operation and a long service life.

It is a further object of this invention to provide adjustment means for increasing or decreasing the operating length of the individual tie rods and toggle arms.

This invention embodies other novel features, details of construction and arrangement of parts which are hereinafter set forth in the specification and claims and illustrated in the accompanying drawings, forming part thereof, wherein:

Fig. 2 is a fragmentary sectional view taken on the line 2—2 of Fig. 1.

Fig. 3 is a fragmentary sectional view of the eccentric bushing embodying our invention.

Fig. 4 is a transverse sectional view of the bushing shown in Fig. 3.

Fig. 6 shows a fragmentary enlarged end detail of a toggle arm used in the valve shown in Fig. 5.

Fig. 7 is an end view of the eccentric shaft used with the toggle arm shown in Fig. 6.

Fig. 8 is a plan view of the eccentric shaft shown in Fig. 7.

Fig. 9 is a fragmentary detail view in side elevation showing a modified form of this invention in which both the tie rods and toggle arms are provided with eccentric bushings. This form of the invention is otherwise similar to the form shown in Figs. 1 to 4, inclusive.

Fig. 10 is a sectional view taken along the line 10—10 of Fig. 9.

Fig. 11 is a fragmentary detail view in side elevation showing a modification of the toggle mechanism illustrated in Fig. 5, in which the tie rods and toggle arms are provided with eccentric bushings for adjustability.

Similar reference numerals refer to like parts in the various figures.

Figure 1:
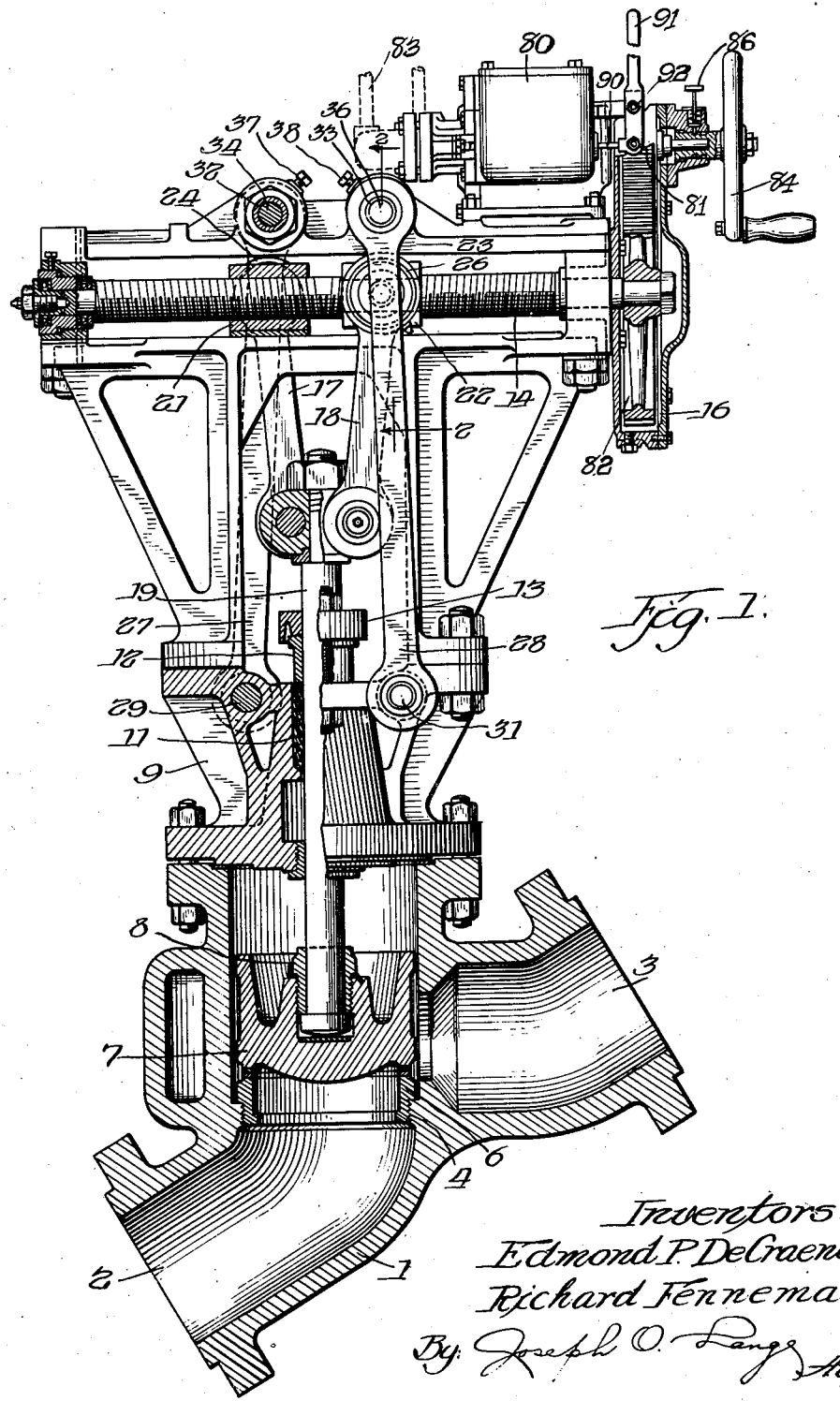
Fig. 1 is a side elevational view, partly in cross-section, showing one form of toggle mechanism embodying features of this invention.

As shown in the drawings and referring specifically to Fig. 1, the reference numeral 1 indicates generally the customary valve body having the inlet and outlet ports 2 and 3 respectively, with the seat 4 supporting the renewable seat ring 6, the disc or closure member 7, the disc stem ring 8, the bonnet 9, the packing 11, the packing gland 12 and the gland follower 13. A threaded toggle shaft 14 is actuated by suitable rotation of the spur gear 16. Approximately one-half of the stem or shaft 14 is threaded, as indicated, with right hand screw threads, and the other half threaded with left hand screw-threads. Preferably the pairs of toggle arms 17 and 18 are pivotally attached at their lower ends to the stem 19 which is directly connected to the valve closure member 7 for reciprocal movement thereof in opening and closing the valve. The upper ends of the toggle arms 17 and 18 are provided with the internally screw-threaded blocks 21 and 22 respectively, for threaded engagement with the shaft 14. Therefore it is apparent that upon rotation of the toggle shaft 14 the toggle arms 17 and 18 move inwardly or outwardly, depending upon the direction of rotation of the shaft 14. Thus when the toggle arms move outwardly the stem 19 of the valve is raised, lifting the closure member 7 from its valve seat at 6. When the toggle arms 17 and 18 are moved inwardly along the toggle shaft 14, the stem 19 of the valve to be operated is moved downwardly and the closure member 7 is moved to a seated position on the body seat ring 6. Preferably, the screw-threaded blocks 21 and 22 do not frictionally contact the upper links 23 because the movable toggle arms 17 and 18, as best shown in Fig. 2, are provided with the roller bearings 24 and 26 at their upper portion for rolling contact with the links 23, thereby reducing friction to a minimum. It will be thus apparent that the entire load of seating the valve closure member is transmitted to the links 23 and in turn is applied to tie rods 27 and 28 pivotally attached to the bonnet. Each pair of tie rods is fixedly positioned to the bonnet at 29 and 31 respectively, as indicated, and at the opposite end portions are bolted to the links 23, as at 32 and 33. It is understood that the links 23 are maintained at a fixed distance above the shaft 14 in order that the links will receive the load instead of the toggle shaft 14 when the valve is being closed. The links 23 are held against endwise displacement by means of the end bearing brackets provided on the supporting member to receive the shaft 14.

Reference to Fig. 1 shows a combined method of hand and hydraulic means of operation, the details of which are not elaborated upon herein in view of being more thoroughly covered in U. S. patent application Serial No. 407,472, filed August 19, 1941, of which we are co-inventors, now U. S. Patent No. 2,348,460, granted May 9, 1944. The hand lever 91 pivoted at 92 disengages a clutch (not shown) which engages gears in the housing 80. The plug 86 is pulled upwardly and the handwheel 84 is pushed inwardly to permit desired clutch engagement, so that upon rotation of the handwheel 84, the spur gear pinion 81 is rotated which in turn rotates the gear 82, the latter being keyed to the toggle shaft 14. Thus the valve can be operated hydraulically by means of the piping 83 from a remote position, or locally by means of the handwheel 84, as desired.

As a significant element of the present invention relating to the adjustable toggle mechanism, attention is specially directed to the pairs of eccentric bushings 34 and 36 employed at the connecting points 32 and 33 of the tie rods 27 and 28 respectively. By reason of such construction, adjustment may easily be made in the length of the tie rods so as to secure the desired predetermined distance between the shaft 14 and the links 23. After the eccentric bushings 34 and 36 are properly adjusted by suitable rotation, each is affixed in the desired position by the pairs of set screws 37 and 38. Figs. 3 and 4 show enlarged views of the eccentric bushings 34 or 36. Note that in its eccentricity, the bushing 34 consists of a cylindrical portion having wall sections of various thicknesses ranging from the relatively thin section, as shown at 39, to the heavier section, as shown at 41. The eccentric bushings 34 or 36 are equipped with hexagonal end flanges 42 by means of which the eccentric bushings may be rotated until the proper length in the tie rods 27 and 28 is obtained, the varying wall thickness producing such effective adjustability.

It is readily apparent that the eccentric bushings shown in Figs. 3 and 4 may be similarly used at the other end of the tie rods at 29 and 31 in order to accomplish the same result, or if desired, the eccentric bushings could be used at either end of the toggle arms 17 or 18.

Figure 5:
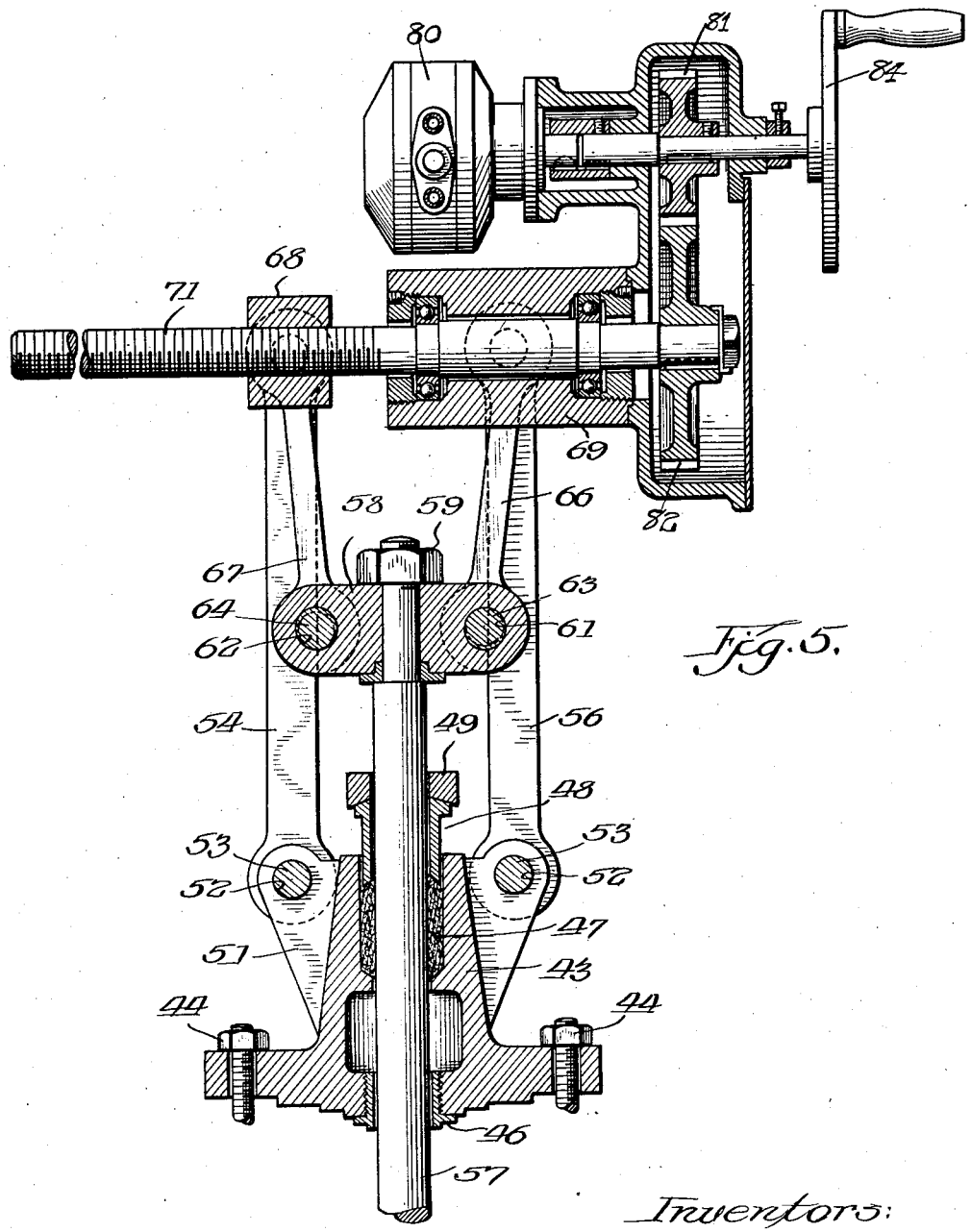
Fig. 5 is a partial assembly sectional view of a toggle operated valve showing a modified form of eccentric adjusting means.

Referring now to Fig. 5, a valve bonnet or upper portion 43 which may be fastened to a conventional valve body (not shown) by means of bolts 44 is presented to illustrate the application of our eccentric adjusting means to a modified form of toggle valve. The bonnet is shown with the usual stem hole bushings 46, the stuffing box packing 47, the gland 48 and the gland follower 49. Diametrically opposed ears or lugs 51 are formed with the apertures 52, the latter being formed to accommodate pins 53 which serve as a pivotal mounting for the supporting members or arms 54 and 56. The usual stem 57, reciprocably movable, is journaled within the valve bonnet and is provided with a cross piece 58 secured to the upper end thereof by means of the nut 59. At the extremities of the cross member 58, the drilled holes 61 and 62 are provided and adapted to receive respectively the eccentric pins 63 and 64, the pins being utilized to pivotally mount the operating members or arms 66 and 67 respectively, as well as to provide for accurate adjustment of the length of the arms 66 and 67 in order that the small angles between the arms 66—67 and 54—56 may be properly coordinated in order to give the proper resultant force downwardly or upwardly upon actuation of the valve stem 57. The toggle arms, preferably arranged in pairs, are connected at their upper end to the toggle blocks 68 and 69 respectively, by means of which the toggle shaft 71 is engaged.

As best shown in the magnified view in Fig. 6, the end of each of the toggle arms 66 and 67 is provided with a circular aperture 72 adapted to be aligned with the drilled holes 61 and 62 in the crosshead 58. The apertured toggle arm end is additionally provided with a threaded hole 73 adapted to receive a set screw which, when the eccentric shaft as shown in Figs. 7 and 8 is in the proper desired position, is tightened to prevent further rotation of the shaft and therefore precludes changes in toggle arm lengths. The eccentric pins either 63 or 64, as shown in Figs. 7 and 8, are provided wth true cylindrical end portions 74 and 76 which are adapted to be received in the apertured toggle arms 66 and 67 at 72. The central eccentric cylindrical portion 77 of the shaft 63 acts in conjunction with the crosshead 58 within the apertures 61 and 62 so that when the eccentric shaft is rotated by means of a tool acting within the end slot 78 the crosshead may be either raised or lowered as necessary. Here similarly after proper adjustment of the eccentric shaft has been made the set screws are tightened within the threaded holes 73 to lock the shaft in its adjusted position.

The positioning of the eccentric shaft may of course be provided at any of the other pivot points for the toggle arms and operate in a like manner. The exact location therefore is a matter of convenience as well as locating the eccentric shaft where it will do the most good.

Fig. 9 shows a further modification of this invention in which the tie rods 27 and 28 are provided with eccentric bushings 34 and 36 respectively, and the toggle arms 17 and 18 are also provided with eccentric bushings 181 and 182, respectively, for the purpose of adjusting same. As shown more clearly in Fig. 10, each pair of toggle arms is pivotally connected to opposite sides of a cross member 183 by means of a pin 184 secured in position by a set screw 186. The eccentric bushings are journaled on the ends of the pins for engagement in apertures 187 provided in the toggle arms and, after adjustment of same, are locked in position in their respective arms by means of set screws 188. This form of invention is otherwise similar to the form shown in Figs. 1 to 4, inclusive.

Fig. 11 shows a modification of the toggle mechanism shown in Fig. 5 in which eccentric bushings 189 and 191 are provided for the toggle arms 66 and 67, respectively, in accordance with Fig. 10; and eccentric bushings 192 and 193 are provided for the tie rods 54 and 56 and employing the construction shown in Fig. 10.

It is apparent that numerous details of construction may be varied throughout a wide range without departing from the principles disclosed herein, and it is therefore not proposed to limit the patent granted hereon otherwise than as necessitated by the prior art.

We claim:

1. In a toggle mechanism, a body, a stem mounted for reciprocable movement in said body; a collar mounted on said stem, toggle arms having their lower ends pivotally connected to said collar, actuating means pivotally engaging the upper ends of said toggle arms, tie rods having their lower ends pivotally connected to said body, link members connected to the upper ends of said tie rods and engaged by the upper ends of said toggle arms, means for adjusting the position of said link members angularly and vertically and means for preventing endwise displacement of said link members.

2. In a toggle mechanism, a body, a stem mounted for reciprocable movement in said body, a collar mounted on said stem, toggle arms having their lower ends pivotally connected to said collar, actuating means pivotally engaging the upper ends of said toggle arms, tie rods having their lower ends pivotally connected to said body, adjustable link members connected to the upper ends of said tie rods and engaged by the upper ends of said toggle arms, eccentric means for adjusting the position of said link members angularly and vertically, and supporting means coacting with said adjustable link members to prevent endwise displacement of the adjustable link members.

3. In a toggle mechanism, a body, a stem mounted for reciprocable movement in said body, a collar mounted on said stem, toggle arms having their lower ends pivotally connected to said collar, actuating means pivotally engaging the upper ends of said toggle arms, tie rods having their lower ends pivotally connected to said body, link members connected to the upper ends of said tie rods and engaged by the upper ends of said toggle arms, eccentric means for adjusting the position of said link members angularly and vertically, and means for locking said eccentric means.

4. In a toggle mechanism, a body, a stem mounted for reciprocable movement in said body, a collar mounted on said stem, toggle arms having their lower ends pivotally connected to said collar, actuating means pivotally engaging the upper ends of said toggle arms, tie rods having their lower ends pivotally connected to said body, link members connected to the upper ends of said tie rods and engaged by the upper ends of said toggle arms, eccentric means for adjusting the position of said link members angularly and vertically, means for locking said eccentric means, and means for holding the link members against endwise displacement.

EDMOND P. DE CRAENE.
RICHARD FENNEMA.